Jan. 27, 1931. E. D. STEVENS ET AL 1,790,287
HOLDER FOR WORD AND PHRASE CARDS
Filed Feb. 7, 1929

WITNESS:

INVENTORS
Edwin D. Stevens
James G. Stradling
BY
Augustus B. Stoughton
ATTORNEY.

Patented Jan. 27, 1931

1,790,287

UNITED STATES PATENT OFFICE

EDWIN D. STEVENS, OF LANSDOWNE, PENNSYLVANIA, AND JAMES G. STRADLING, OF ATLANTIC CITY, NEW JERSEY, ASSIGNORS TO THE JOHN C. WINSTON COMPANY, OF PHILADELPHIA, PENNSYLVANIA, A CORPORATION OF PENNSYLVANIA

HOLDER FOR WORD AND PHRASE CARDS

Application filed February 7, 1929. Serial No. 338,130.

The principal object of the present invention is to provide for enabling teachers to give pupils the highest type of word drill by using words previously read in a primer or reader in new context and arrangement. In other words, to enable a teacher to build new phrases, sentences or stories by arranging the word and phrase cards in any desired order in the card holder for exhibition to the pupils.

Generally stated, the invention may be said to comprise a holder for word and phrase cards used in schools, comprising two leaves hinged together at one of their edges and provided at the other of their edges with catch members, and one of said leaves provided at its edge with suspension means, each of said leaves comprising a generally rectangular board and straight strips arranged in parallel spaced relation and secured at their ends only to the face of the board, and a cover as of paper secured over the face of the board, and strips and slitted at one edge of the strips to provide pockets for receiving and holding and aligning said cards.

The invention also comprises the improvements to be presently described and finally claimed.

Referring to the drawing forming part hereof

Figure 1:
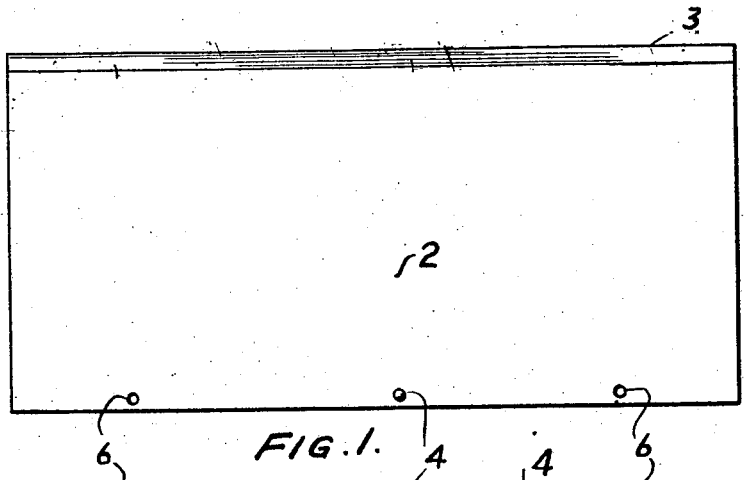
Figure 1 is a front view of the holder in closed position.
Figure 2:
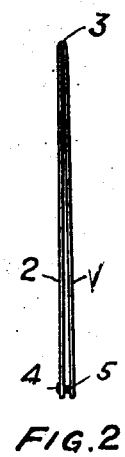
Fig. 2 is an end view of Fig. 1 with the leaves of the holder partially open.

In the drawing 1 and 2 are leaves hinged together at one of their edges as at 3. 4 and 5 are the members of a catch and they are provided at the free edges of the leaves. One of the leaves 2 is provided at its free edge with suspension means 6 which may consist of eyelets. Each leaf comprises a generally rectangular board as of cardboard and straight strips 7 arranged in parallel spaced relation and secured at their ends only to the face of the board. There is a cover 8 as of paper and it is secured or pasted over the face of the board and strips. This cover is slitted as at 9 at the upper edges of the strips to provide pockets for receiving and holding and aligning word and phrase cards 10.

Figure 3:
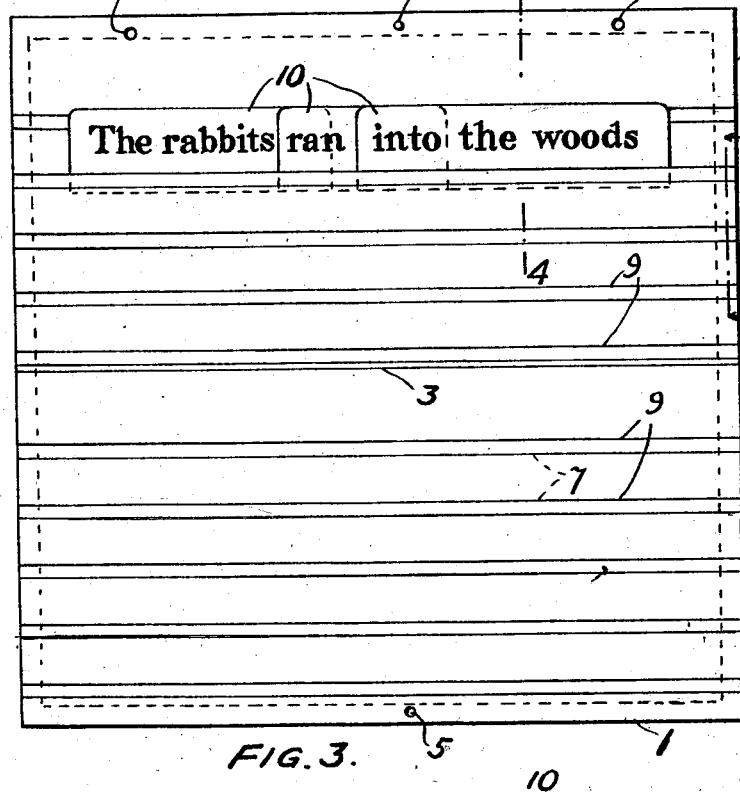
Fig. 3 is a front view of the holder in open position.
Figure 4:
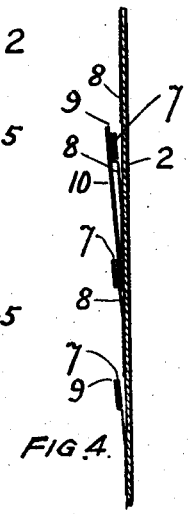
Fig. 4 is a sectional view somewhat diagrammatic taken on the line 4—4 of Fig. 3.
Figure 5:
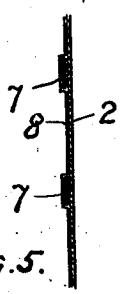
Fig. 5 is a similar view taken on the line 5—5 of Fig. 3.
Figure 6:
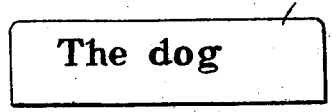
Fig. 6 is a detached view of one of the cards.

In use the holder when folded or closed is a convenient receptacle for the word and phrase cards, and when the holder is open, as shown in Fig. 3, it provides a convenient device in the pockets of which the teacher may arrange cards in any desired order to display phrases or sentences to the children in any required or desired arrangement or order.

The holder is obviously comparatively inexpensive since it may consist of paper and like material and it is not expensive to make and extremely convenient in use.

We claim:

1. A holder for word and phrase cards used in schools comprising two leaves hinged together at one of their edges and provided at the other of their edges with catch members and one of said leaves provided at one of its edges with suspension means, each of said leaves comprising a generally rectangular board, straight strips arranged in parallel spaced relation and secured at their ends only to the face of the board, and a paper cover secured over the face of the board and strips and slitted at the upper edges of the strips to provide pockets for receiving and holding and aligning said cards and fasten to the board adjacent the lower edges of the strips.

2. A holder for word and phrase cards used in schools comprising two leaves hinged together at one of their edges and one of said leaves provided at one of its edges with suspension means, each of said leaves comprising a generally rectangular board, straight strips arranged in parallel spaced relation and fastened at their ends to the board, and a paper cover secured over the face of the board and strips and slitted at the upper edges of the strips to provide pockets for receiving and holding and aligning said cards.

EDWIN D. STEVENS.
JAS. G. STRADLING.